United States Patent
Hill

(10) Patent No.: US 8,782,767 B2
(45) Date of Patent: Jul. 15, 2014

(54) UPGRADABLE SECURITY MODULE

(75) Inventor: Michael John Hill, Coppet (CH)

(73) Assignee: Nagravision, S.A., Cheseaux-sur-Lausanne (CH)

( * ) Notice: Subject to any disclaimer, the term of this patent is extended or adjusted under 35 U.S.C. 154(b) by 1458 days.

(21) Appl. No.: 12/095,483

(22) PCT Filed: Nov. 30, 2006

(86) PCT No.: PCT/EP2006/069150
§ 371 (c)(1),
(2), (4) Date: Jun. 5, 2008

(87) PCT Pub. No.: WO2007/063108
PCT Pub. Date: Jun. 7, 2007

(65) Prior Publication Data
US 2008/0307499 A1  Dec. 11, 2008

(30) Foreign Application Priority Data

Nov. 30, 2005  (EP) .................................. 05111532

(51) Int. Cl.
*G06F 21/00* (2013.01)
*G06F 21/12* (2013.01)
*G06F 21/77* (2013.01)
*G06F 21/34* (2013.01)

(52) U.S. Cl.
CPC .............. *G06F 21/123* (2013.01); *G06F 21/77* (2013.01); *G06F 21/34* (2013.01)
USPC .................. 726/9; 726/2; 726/3; 726/5; 726/6

(58) Field of Classification Search
CPC ........ G06F 21/123; G06F 21/77; G06F 21/34
USPC ............................................. 726/9, 2, 3, 5, 6
See application file for complete search history.

(56) References Cited

U.S. PATENT DOCUMENTS

| 5,149,945 A | * | 9/1992 | Johnson et al. | 235/380 |
| 5,237,609 A | * | 8/1993 | Kimura | 713/193 |
| 5,682,032 A | * | 10/1997 | Philipp | 235/422 |
| 5,734,722 A | * | 3/1998 | Halpern | 714/798 |

(Continued)

FOREIGN PATENT DOCUMENTS

EP  1486907  5/2008

OTHER PUBLICATIONS

Samar; Unified Login with Pluggable Authentication Modules (PAM); Proceeding CCS '96 Proceedings of the 3rd ACM conference on Computer and communications security; pp. 1-10; ACM New York, NY, USA 1996.*

(Continued)

*Primary Examiner* — Bradley Holder
(74) *Attorney, Agent, or Firm* — DLA Piper LLP US

(57) ABSTRACT

The aim of the present invention is to provide a security module capable of supporting the different functions of the latest and the previous generations, by avoiding any possible attack due to this adaptability. This aim is attained by a security module comprising first communication means to a host device, first storage means and first decryption means, characterized in that it includes a state module and second communication means and physical activation or deactivation means of said second means, such activation or deactivation being managed by the state module.

12 Claims, 1 Drawing Sheet

(56) References Cited

U.S. PATENT DOCUMENTS

| | | | | |
|---|---|---|---|---|
| 6,009,363 | A * | 12/1999 | Beckert et al. | 701/33 |
| 6,055,581 | A * | 4/2000 | Berglund et al. | 710/11 |
| 6,065,679 | A * | 5/2000 | Levie et al. | 235/462.47 |
| 6,175,789 | B1 * | 1/2001 | Beckert et al. | 701/33 |
| 6,268,802 | B1 * | 7/2001 | Foladare et al. | 340/7.2 |
| 6,385,727 | B1 * | 5/2002 | Cassagnol et al. | 713/193 |
| 6,438,666 | B2 * | 8/2002 | Cassagnol et al. | 711/163 |
| 6,538,656 | B1 * | 3/2003 | Cheung et al. | 345/519 |
| 6,543,690 | B2 * | 4/2003 | Leydier et al. | 235/451 |
| 6,553,481 | B1 * | 4/2003 | Langton | 712/37 |
| 6,573,905 | B1 * | 6/2003 | MacInnis et al. | 345/629 |
| 6,625,703 | B2 * | 9/2003 | Goodman et al. | 711/162 |
| 6,636,222 | B1 * | 10/2003 | Valmiki et al. | 345/505 |
| 6,661,422 | B1 * | 12/2003 | Valmiki et al. | 345/530 |
| 6,768,774 | B1 * | 7/2004 | MacInnis et al. | 375/240.15 |
| 6,772,239 | B2 * | 8/2004 | Langton | 710/31 |
| 6,779,734 | B2 | 8/2004 | Hill | |
| 6,813,668 | B2 * | 11/2004 | Tseng et al. | 710/301 |
| 7,224,053 | B2 * | 5/2007 | Yamamoto | 257/679 |
| 7,324,450 | B2 | 1/2008 | Oliver | |
| 7,383,982 | B2 * | 6/2008 | Yamamoto et al. | 235/375 |
| 2001/0001319 | A1 * | 5/2001 | Beckert et al. | 701/36 |
| 2002/0019807 | A1 * | 2/2002 | Halpern | 705/39 |
| 2002/0035651 | A1 * | 3/2002 | Langton | 710/5 |
| 2003/0154326 | A1 * | 8/2003 | Tseng et al. | 710/1 |
| 2004/0089725 | A1 * | 5/2004 | Hill | 235/492 |
| 2004/0129787 | A1 * | 7/2004 | Saito et al. | 235/492 |
| 2004/0130016 | A1 * | 7/2004 | Yamamoto | 257/679 |
| 2004/0190558 | A1 | 9/2004 | Oliver | |
| 2004/0263319 | A1 | 12/2004 | Huomo | |
| 2005/0077355 | A1 * | 4/2005 | Yamamoto et al. | 235/439 |
| 2006/0059503 | A1 * | 3/2006 | Will et al. | 725/6 |

OTHER PUBLICATIONS

Itoi; Practical security systems with smartcards; Proceedings of the Seventh Workshop on Hot Topics in Operating Systems; Date of Conference: 1999; Conference Location : Rio Rico, AZ ; pp. 185-190; IEEE Xplore.*

International Search Report issued in PCT/EP2006/069150, dated Apr. 16, 2007.

English Language Translation of International Search Report issued in PCT/EP2006/069150, dated Apr. 16, 2007.

Written Opinion issued in PCT/EP2006/069150, dated Apr. 16, 2007.

English language translation of Written Opinion issued in PCT/EP2006/069150, dated Apr. 16, 2007.

* cited by examiner

UPGRADABLE SECURITY MODULE

DOMAIN OF THE INVENTION

The present invention relates to the domain of electronic security modules, particularly security modules dedicated to access control to broadcast events and others mass medias.

STATE OF THE ART

The security operations are generally carried out in a security module associated to the multimedia unit or the decoder. Such security module can be implemented particularly in four different forms. One of them is a protected microprocessor card usually in the form of an ISO 781.6, a smart card or, more generally, an electronic module (in the form of a key, badge, . . . ). Such a module is generally detachable from and connectable to the decoder. The form involving electric contacts is the most used one, but does not exclude a connection without contacts, for instance, the ISO 14443 type or a combination of types with and without contacts.

A second known form is that of an integrated circuit package, generally placed in an irremovable and permanent way in the decoder casing. A variant consists of a circuit mounted on a fuse-base or connector such as a SIM module connector.

In a third form, the security module is integrated in an integrated circuit package having also other functions, for instance in a decoder descrambling module or decoder microprocessor.

In practice, the evolution of these security modules between the first modules used in a decoder sets and those installed with the latest decoders is prominent. Several generations of security modules can coexist within the same sets of a media distribution operator for instance via satellite, cable or Internet.

Obviously, should security faults be detected, the replacement of old modules is then carried out.

The difference between module generations is often related to services that accept the user's unit to which they are associated. Indeed, if a module version does not contain the "purse" function, it will be impossible to subtract from a credit and thus to authorize the content consumption without a bidirectional exchange with a management center.

Thus, a module of a certain generation will offer a limited number of services.

This is also a constraint for the users' units, to keep the compatibility with all the module of former generations. The process currently used is the identification of the security module by the user's unit. This identification can also be bidirectional, that is, the security module request the user's unit in order to know the characteristics of same.

The modification of security module generation can lead to material modifications, for instance by the availability of new communication ports. An example of such a security module is disclosed in the U.S. Pat. No. 6,779,734.

It is thus important that a security module can adapt to user's units and adjust its functionalities according to the communication means of the user's unit.

A malicious third party could use a modified decoder and attempt to access added high-value services by trying to appear as a decoder of the latest generation. Once in this mode, he/she will attempt to modify the internal memory of the security module to his advantage. In addition, the presence of advanced communication means, such as a USB 2.0, in such a module allows these third parties to multiply their attacks by these high rate communication means in comparison with other much slower communication means (ISO7816).

In the EP 1 486 907 application, a security module is also configurable according to the environment. The aim is to perform automatic configuration according to the signals received by the host device. Thus, if a malicious third party imitates a particular environment, the module will adapt to this environment even if it were not authorized.

BRIEF DESCRIPTION OF THE INVENTION

The aim of the present invention is to provide a security module able to support the different functionalities and physical configurations of the last generation and the previous generations' connectivity, while avoiding any new attack possibility due to this adaptability.

This aim is obtained by a security module (SM) Comprising first communication means to a host device, first storage means (MEM0) and first decryption means (ENC0), characterized in that it includes a state module (ME) and second communication means (COM1), electric activation/deactivation means (TSB) of said second means, these activation/deactivation means being controlled by the state module (ME), and in that it includes reception means of a security message allowing the modification of the state of said state module (ME).

Thus, according to the state stored in the module state memory, the second communication means are completely inoperative and cannot be used by a third party for dishonest purposes. The electric activation/deactivation of the communication means are controlled by material means such as three state (tri-state) elements or "High Voltage bidirectional MOS-FETs" according to the result of a cryptographic operation.

The same goes for other parts of the security module such as a memory zone. This memory can contain data such as keys or serial numbers, which are completely deactivated thus impossible to access according to the memory state. This memory state sends locking or unlocking material signals so that even in case a hack program operates in such a module, it cannot access this memory. The same mechanism can apply to other elements such as a decoding engine or an asymmetrical decryption module.

There are several solutions to define the operation mode of the security module.

A. Pre-Configuration

At the time of the manufacturing of the security module, or during a personalization step of said module, it is pre-configured to function according to a particular environment. Obviously this pre-programming can be modified during another step of pre-configuration in an initialization environment.

B. Message Activation

At the initialization, the module is in a basic mode and only the communication means being common to all the guest devices are activated. According to the pre-configuration, it can be in a particular mode considering the purpose of such a module. For changing the state of the security module and thus activating other functionalities, the module waits for the reception of a security message, which authorizes it to perform such a change. Only after having decoded such message and after verification of this message the module will change its state and thus will open the second communication means.

BRIEF DESCRIPTION OF DRAWINGS

The invention will be better understood with the help of the following detailed description, which refers to enclosed drawings that are given as a non-restrictive example, namely.

DETAILED DESCRIPTION OF AN EMBODIMENT OF THE INVENTION

Figure 1:
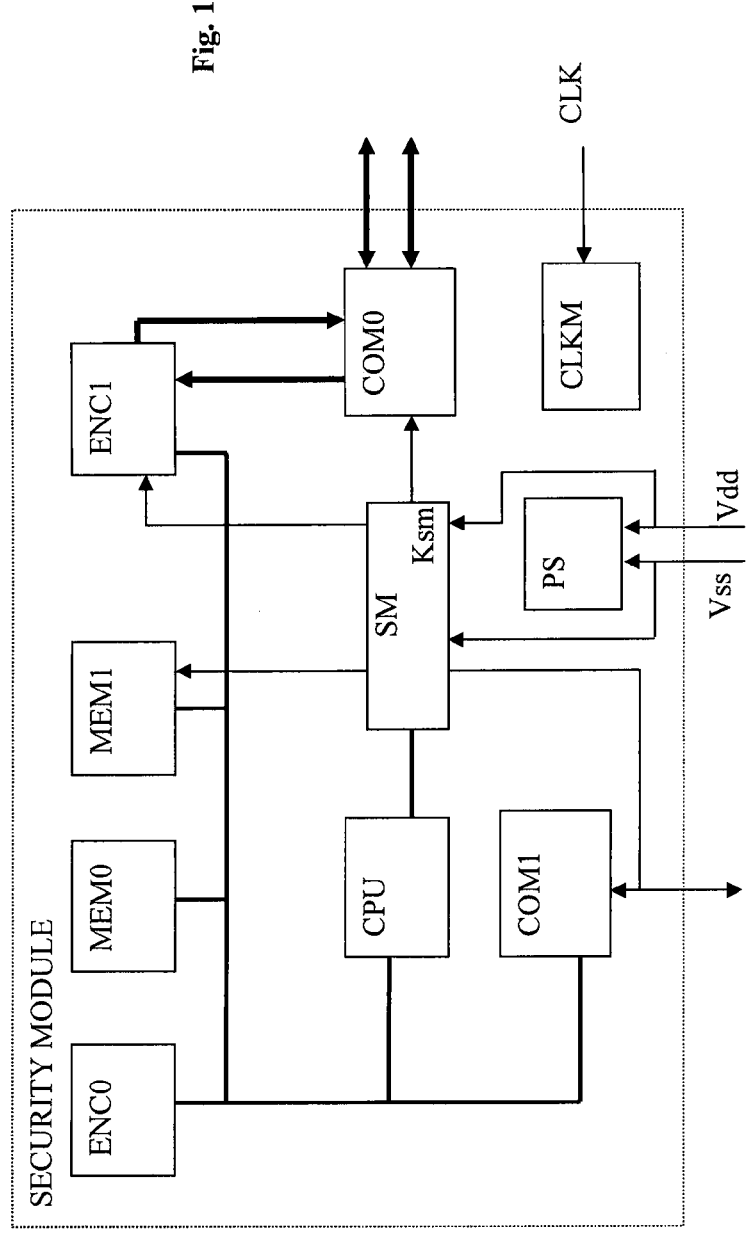
FIG. 1 shows a global scheme of a security module.

FIG. 1 shows an example of a security module (ME) comprising an embodiment of the invention. According to this example, this module includes first communication means (COM0) and second communication means (COM1). Likewise, the available memory resource is divided in several parts (here 2) MEM0 and MEM1, being able to be used for the microprocessor program.

According to our example, the module has a first encryption/decryption module (ENC0) as well as a second encryption/decryption module (ENC1).

According to the illustrated example in FIG. 1, the encryption/decryption module is associated with a high-speed communication bus (COM1). A possible realization is the decryption of the audio/video data flow according to the DVB Common Descrambler standards or the owner's descrambler.

The different modules are associated to the processor (CPU), which coordinates the operations, initializes the modules, transmits the results from one module to another, etc.

A particular module named state module (ME) will control the activation and the deactivation of certain modules and more generally the behavior of the security module (SM). According to the particular example in FIG. 1, this state module (ME) controls the second communication means (COM1), the second encryption/decryption means (ENC1) as well as the memory (MEM1). Depending on the state of this memory, signals are independently transmitted by the processor (CPU) to activate or deactivate the modules.

Figure 2:
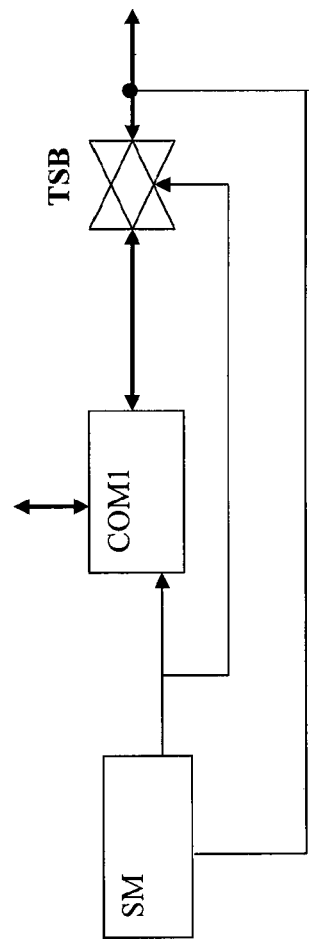
FIG. 2 shows the control of an input/output port.

This activation is shown in FIG. 2 where the state module ME is transmitting a command to the communication module (COM0), this command also acting upon the emitted or received signals by means of a locking element such as an insulating circuit TSB, e.g. Tri-State, "High Voltage bidirectional MOSFETs" or any other element galvanically insulating the physical connection of the security module (ME). This element allows the insulation of a communication line by putting it in high impedance mode. The state module (ME) thus controls the electric activation/deactivation of the communication module (COM0).

When the state module (ME) has deactivated the communication module (COM0), the state module (ME) continues supervising the activity on the communication module (COM0). The state module (ME) can emit a warning message if it continues to ascertain the arrival of spikes.

There are other ways to influence the state module (ME). As indicated in the application preamble, the security module (SM) determines, according to the data received from the user's unit, which state corresponds to this unit.

According to a variant using a security message, it causes the change of the state of the state module (ME) as soon as this message is received and verified by the security module (SM).

According to that variant, this message is decrypted and verified by the processor (CPU) and the result is stored in the state module (ME). Thus, it acts as a memory with commands departing in the direction of the different modules concerned and as a supervision module in order to supervise the activity of all the communication paths.

According to another alternative, all or part of the message is directly treated by the state module (ME). The message can be previously processed by the processor (CPU), for instance by a key suitable for the security module (SM) contained in the first memory (MEM0), and then transmitted to the state module (ME). The latter has a clean key (Ksm), which will allow to verify the command, contained in the message. This verification can be made according to several well-known methods, such as the use of a signature on the generated message with an asymmetrical key, other asymmetrical key being the key Ksm of the module of the state memory. The microprocessor (CPU) cannot access the state memory without knowing the key pertaining to the state module (ME). Only the state module (ME) will accept a message prepared by the management center.

If the verification is correct, the new state is loaded in the state module (ME) with subsequent consequences on the other modules.

According to a variant process of the invention, the state module (ME) performs the supervising operations of the state of the security module (SM). It receives, for instance, the positive supply voltage Vdd (generally 5V), which also goes on the supply module PS and observes risk behaviors, such as a sudden voltage change, or abnormally high or low voltage. According to the defined criteria, it will be able to change its state without receiving a message, for instance, by generating an error message, or by deactivating certain functions of said module. The communication paths (COM1, COM0) are supervised by the state module (ME). By communication path we understand the paths through which input or output data pass from/to the security module (SM), such as the I/O path according to the ISO7816 standard, or the USB path or other high data transfer rate ports comprising infrared ones, etc. The connection paths are, as such, the other paths which are linked with the host device such as supply (Vdd, Vss) (Vss is the negative, or ground, supply voltage), clock (CLK) or reset.

Likewise, if it determines that spikes and noises are present on the communication means, such as the first communication means, it can also change its state or initiate countermeasures. Furthermore, the state module (ME) can comprise a supervising profile, on one hand, specific to the communication path or supervised connection and, on the other hand, according to the state of the state module (ME). Thus the verification parameters of the proper performance of a connection path can vary according to the state of the state module (ME). Voltage variations of +/−10% will be accepted in a state while in another state only +/−5% will be accepted. The same goes for the number of spikes, microcuts or others. These parameters are programmable and can be modified by receiving a security message.

This supervision can be made even if the communication path or means are deactivated.

The state module (ME) can also control the internal resources of the security module (SM). The second, memory (MEM1) can be either partially or completely deactivated. Moreover this deactivation can be made by either an electronic command (reading and/or writing locking) or by directly acting on the supply of said memory. This memory can be defined, according to the state, as read only, writing only or reading/writing. The same goes for others resources of the security module (SM) such as encryption/decryption modules (ENC0, ENC1). The state module (ME) can control modules and/or functions that are authorized or forbidden according to the state of the state module (ME). These functions are for instance the use of a high transfer data rate internal bus or a regulation mechanism of the clock. These modules are, for instance, a clock generator, an encryption/decryption module, a memory, a voltage regulator by a charging pump etc.

The incoming message to the security module (SM) preferably comes from a management center. This message can arrive to the security module SM either by the first or the second communication means. At the time of the initialization on site of the security module and its host device, messages are transmitted via the host device for the security module (SM). The management center knows the characteristics of the host apparatus as well as the subscriptions of the related subscriber and formats a message for the security module containing its working state. This message can be specific to each security module, or identical for all the security modules, a message containing a user's unit version and the security level of the security module (SM). Thus, if there are 8 different existing user's units, there will be eight messages in the transmission flow, each one comprising a user's unit version and the configuration of the corresponding security module (SM).

According to another embodiment, each host device according to its characteristics, stores a message, which will be subsequently transmitted, to the security module (SM) as soon as this is connected. The state of the security module (SM) will match the specifications of the host device.

Once the security module (SM) has determined its state, it preservers this state and is thus locked. In order for the security module (SM) to accept a new initialization, the management center can send a message that authorizes a new configuration process. This message can be conditional, that is to say, it can have a security module version indication or a state of the state module (ME) as a restarting condition.

The invention claimed is:

1. A security module comprising:
   a first communication port connectable to a host device;
   a first storage device;
   a first decryption means;
   a hardware or software state module, which is configured to detect activity on a communication port and to determine, according to the activity, a state of said state module;
   a second communication port; and
   an insulating circuit placed in series with the second communications port and configured to electronically isolate said second communication port, said insulating circuit being controlled by the state module;
   wherein the insulating circuit includes tri-state or bidirectional MOSFET elements; and
   where at least a portion of a physical connection path including the first communication port is different from at least a portion of a connection path including the second communication port;
   wherein the security module is configured to receive a security message via the first or second communication port, and modify a state of said state module defining an accessibility of the security module to the host device via the second communication port in response to the security message.

2. The security module according to claim 1, wherein the second communication port is connected to the host device by a contact physically different from a contact of the first communication port.

3. The security module according to claim 1, wherein a second insulating circuit is placed in series with said first communication port, the second insulating circuit being operable to electrically isolate said first communication port, the second insulating circuit including tri-state or bidirectional MOSFET elements.

4. The security module according to claim 1, wherein a third insulating circuit is also placed in series with at least one connection path configured to carry operating signals of the security module, the third insulating circuit being operable to electrically isolate said at least one connection path.

5. The security module according to claim 1, wherein the security module comprises a second storage device, the state module being configured to activate or deactivate said second storage device.

6. The security module according to claim 1, wherein the state module comprises modules and/or functions that are authorized or forbidden according to the state of the state module.

7. The security module according to claim 6, wherein the state of the state module is configured to limit an access level to a second storage device to read only, write only, and read/write mode.

8. The security module according to claim 1, wherein the security module includes second decryption means, these second decryption means being activated/deactivated by the state module.

9. The security module according to claim 8, wherein power is supplied to the second decryption means under control of the state module.

10. The security module according to claim 1, wherein the state module includes a supervision logic module configured to monitor current working parameters of all connection paths of the security module and to allow the state of the state module to be changed according to a supervision result.

11. The security module according to claim 10, wherein the supervision logic module is connected to the connection paths of said security module.

12. The security module according to claim 10, wherein the supervision logic module comprises a supervision profile of communication paths that can be specific to each state of the state module.

* * * * *